US009262301B2

(12) United States Patent
Hopley

(10) Patent No.: US 9,262,301 B2
(45) Date of Patent: Feb. 16, 2016

(54) OBSERVABILITY CONTROL WITH OBSERVABILITY INFORMATION FILE

(75) Inventor: Allen Hopley, Metcalfe (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 390 days.

(21) Appl. No.: 13/468,727

(22) Filed: May 10, 2012

(65) Prior Publication Data

US 2013/0305094 A1 Nov. 14, 2013

(51) Int. Cl.
G06F 9/44 (2006.01)
G06F 9/45 (2006.01)
G06F 11/36 (2006.01)

(52) U.S. Cl.
CPC ........ *G06F 11/3624* (2013.01); *G06F 11/3636* (2013.01); *G06F 11/3644* (2013.01); *G06F 11/362* (2013.01)

(58) Field of Classification Search
CPC ........................................ G06F 11/36–11/3696
See application file for complete search history.

(56) References Cited

U.S. PATENT DOCUMENTS

| | | | |
|---|---|---|---|
| 5,821,950 A | 10/1998 | Rentschler et al. | |
| 6,968,546 B2* | 11/2005 | Lueh ............................. | 717/158 |
| 7,409,677 B1* | 8/2008 | Leventhal et al. ............. | 717/130 |
| 7,818,721 B2* | 10/2010 | Sundararajan et al. ....... | 717/130 |
| 7,962,905 B2* | 6/2011 | Inamdar ........................ | 717/158 |
| 8,739,135 B2* | 5/2014 | Eigler ................. G06F 11/3466 717/130 |
| 2002/0144241 A1* | 10/2002 | Lueh ................... G06F 9/45516 717/136 |
| 2003/0149960 A1* | 8/2003 | Inamdar ........................ | 717/118 |
| 2004/0103408 A1* | 5/2004 | Chilimbi et al. .............. | 717/140 |
| 2006/0101419 A1* | 5/2006 | Babcock ............. G06F 11/3676 717/130 |
| 2007/0180439 A1* | 8/2007 | Sundararajan et al. ....... | 717/158 |
| 2008/0005730 A1* | 1/2008 | Inamdar ........................ | 717/158 |
| 2009/0249306 A1* | 10/2009 | Li ........................ G06F 11/3676 717/130 |
| 2009/0249308 A1* | 10/2009 | Li ........................ G06F 11/3676 717/132 |
| 2009/0249309 A1* | 10/2009 | Li ........................ G06F 11/3676 717/132 |
| 2010/0088683 A1* | 4/2010 | Golender ............. G06F 9/4446 717/128 |
| 2012/0089966 A1* | 4/2012 | Martin et al. .................. | 717/133 |
| 2013/0055197 A1* | 2/2013 | Balan et al. ................... | 717/105 |
| 2013/0159977 A1* | 6/2013 | Crosetto ............. G06F 11/3636 717/128 |

OTHER PUBLICATIONS

Devadas, Srinivas et al., "An Observability-Based Code Coverage Metric for Functional Simulation", 1996, pp. 1-8.*
Briand, Lionel C., et al., "Instrumenting Contracts with Aspect-Oriented Programming to Increase Observability and Support Debugging", 2005, pp. 1-4.*
Costa, Jose C., et al., "Observability Analysis of Embedded Software for Coverage-Directed Validation", 2000, pp. 27-32.*

(Continued)

*Primary Examiner* — Thuy Dao
*Assistant Examiner* — Christopher Franco
(74) *Attorney, Agent, or Firm* — Myers Bigel Sibley & Sajovec, P.A.

(57) ABSTRACT

Methods of managing observability code in an application program include generating an application program including an observability point, the observability point including a location in the application at which observability code, or a call to observability code, can be inserted, loading the application program into a memory of a target system, retrieving observability information from an observability point information file, and inserting the observability code, or the call to the observability code, at the observability point in the memory of the target system using the observability information retrieved from the observability point information file.

18 Claims, 6 Drawing Sheets

(56) References Cited

OTHER PUBLICATIONS

Mahrenholz, Daniel et al., "Program Instrumentation for Debugging and Monitoring with AspectC++", 2002, pp. 1-8.*

Ekman, Mathias et al., "Dynamic Patching of Embedded Software", 2007, pp. 1-9.*

Navabpour, Samaneh, et al., "Software Debugging and Testing using the Abstract Diagnosis Theory", 2011, pp. 111-120.*

Project Settings for a C++ Debug Configuration; http://msdn.microsoft.com/en-us/library/kcw4dzyf/aspx, accessed May 10, 2012.

Remote Debugging; http://help.eclipse.org/helios/index.jsp?topic=%2Forg.eclipse.jdt.doc.user%2Fconcepts%2Fcremdbug.htm, accessed May 10, 2012.

* cited by examiner

OBSERVABILITY CONTROL WITH OBSERVABILITY INFORMATION FILE

FIELD

The present inventive concepts relate to computing systems, and in particular to software observability in embedded computing systems.

BACKGROUND

In computing systems, "observability" refers to the ability to obtain information about the internal workings of the software of the system as the system is operating. For example, observability allows a programmer or user to keep track of the values of variables, the number of times a function or module is called, the amount of time various computing tasks take to complete, etc. Observability code is therefore ancillary to the main code that actually performs the function of the software.

Although the inclusion of observability code incurs an overhead cost, the inclusion of observability may be particularly important or desirable in embedded systems. An embedded system is a computer system designed for specific functions and that is embedded as part of a complete device. Embedded computing systems are ubiquitous in modern society, and can include machine controllers, thermostats, engine controllers, watches, media players, etc. The embedded computing device on which computer program code is loaded is referred to herein as a "target platform" or more simply as a "target."

Embedded systems may be contrasted with general-purpose computers, which are typically designed to be flexible and powerful, with a wide range of peripheral connectivity options. While general purpose computing systems typically include a wide range of input/output and storage capabilities, the I/O and storage capabilities of embedded systems may be more limited. Therefore, it may be difficult to monitor the activity and behavior of software in an embedded system without the assistance of observability code.

Functions and instructions which enable observability in software can be included in the source code of the software prior to compilation. (Compilation refers to the conversion of human-readable source code into machine readable instructions referred to as "machine code" or "object code.") Compiling observability code into the machine code can undesirably increase the size of the machine code, however. Alternatively, machine instructions which cause an interrupt can be inserted into the program memory while the program is running on a target platform. However, it can be difficult to determine exactly where in the program memory such instructions should be placed.

Conventional approaches to providing observability involve the compiler generation of debug information including the program memory location of lines of code and the memory locations (addresses or register names) of variables and data structures, coupled with a debugging program running on a host computer that can interact very closely with the target program. However, with those approaches, there is no notion of particularly interesting observability points—all locations in the code are treated as equally interesting. Locations in the code, and locations of interesting data structures can become obfuscated by the compiler's machine code optimization. The actual insertion of observability instructions at such locations can be problematic (finding the appropriate location) and inefficient (often involve interrupts). These methods can also interfere with proper operation of the target, and may require a skilled user with in-depth knowledge of the source code. Often, for a deployed target, there is no host computer that has the appropriate connection to the target to even attempt to perform this type of debugging.

SUMMARY

Some embodiments provide methods of managing observability code in an application program. The methods include generating an application program including an observability point, the observability point including a location in the application at which observability code, or a call to observability code, can be inserted, loading the application program into a memory of a target system, retrieving observability information from an observability point information file, and inserting the observability code, or the call to the observability code, at the observability point in the memory of the target system using the observability information retrieved from the observability point information file.

The methods may further include generating the application program including the observability code, or the call to the observability code, at the observation point, and before loading the application program into the memory of the target system, patching the observability code, or the call to the observability code, out of the application program. Loading the application program into the memory of the target system may further include loading the application program without the observability code, or the call to the observability code, into the memory of the target system.

Patching the observability code, or the call to the observability code, out of the application program may further include replacing the observability code, or the call to the observability code, with no-op instructions.

Patching the observability code, or the call to the observability code, out of the application program may further include inserting an unconditional jump at the observation point that bypasses the observability code, or the call to the observability code.

The methods may further include retrieving second observability information from the observability point information file, inserting second observability code, or a call to second observability code, at the observability point in the memory of the target system using the second observability information retrieved from the observability point information file, and executing the application program including the second observability code, or the call to the second observability code, from the memory of the target system.

The methods may further include writing the observability information to the observability point information file in connection with patching the observability code, or the call to the observability code, out of the application program.

The observability information may further include an address of the observability point and the observability code, or the call to the observability code.

The observability information may further include an identification code that is unique to the observability point.

The observability point information file may be stored in the target system.

The observability point information file may be stored remotely from the target system.

Some embodiments provide a host system configured to manage observability code in an application program on a target system. The host system includes a processor, and a monitoring application executed by the processor. The target system includes an application program including an observability point, the observability point including a location in the application program at which the observability code, or a call to the observability code, can be inserted. The monitoring application is configured to retrieve observability information from an observability point information file, and to provide appropriate instructions for the target system to insert the observability code, or the call to the observability code, at the observability point in the memory of the target system using the observability information retrieved from the observability point information file.

The monitoring application may be further configured to generate the application program including the observability code, or the call to the observability code, at the observation point, and, before loading the application program into the memory of the target system, to patch the observability code, or the call to the observability code, out of the application program so that the application program may be loaded into the memory of the target system without the observability code, or the call to the observability code, into the memory of the target system.

The monitoring application may be further configured to patch the observability code, or the call to the observability code, out of the application program by replacing the observability code, or the call to the observability code, with no-op instructions.

The monitoring application may be further configured to patch the observability code, or the call to the observability code, out of the application program by inserting an unconditional jump at the observation point that bypasses the observability code, or the call to the observability code.

The monitoring application may be further configured to retrieve second observability information from the observability point information file, and to insert second observability code, or a call to second observability code, at the observability point in the memory of the target system using the second observability information retrieved from the observability point information file.

The monitoring application may be further configured to write the observability information to the observability point information file in connection with patching the observability code, or the call to the observability code, out of the application program.

The observability information may further include an address of the observability point and the observability code, or the call to the observability code.

The observability information may further include an identification code that is unique to the observability point.

Methods of managing observability code in an application program according to further embodiments include generating the application program including first observability code, or a call to the first observability code, at an observability point in the application program, patching the first observability code, or the call to the first observability code, out of the application program, writing first observability information to an observability point information file in connection with patching the first observability code, or the call to the first observability code, out of the application program, the first observability information describing the observability point and the first observability code, or the call to the first observability code, loading the application program without the first observability code, or the call to the first observability code, into a memory of a target system, retrieving second observability information from the observability point information file, the second observability information describing the second observability code, or the call to the second observability code, and inserting the second observability code, or a call to the second observability code, at the observability point in the memory of the target system.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
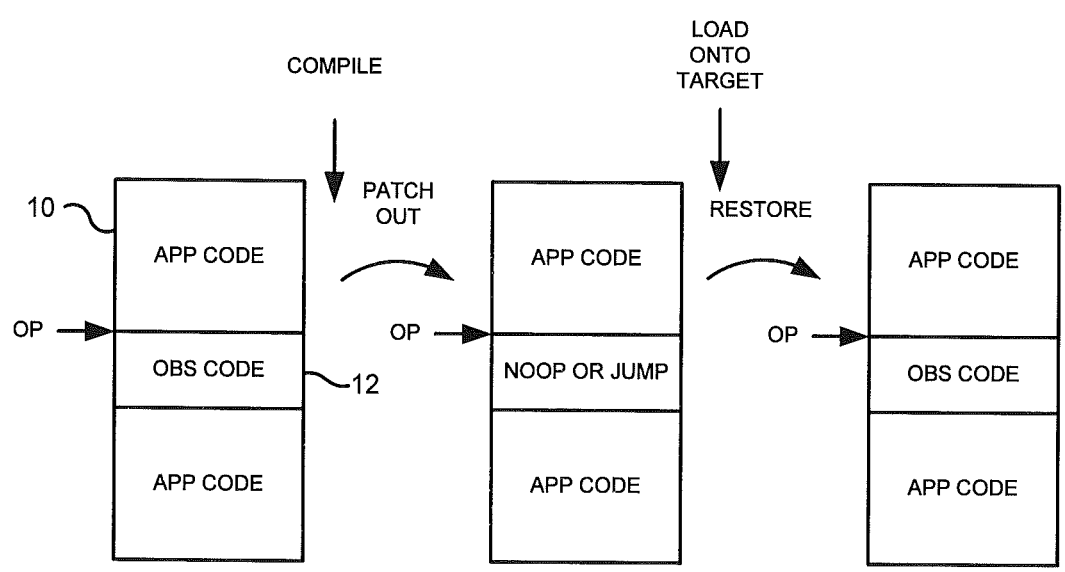
FIG. 1 is a block diagram that illustrates the patching of observability code in and out of an application program.

Observability code may be included in software prior to compilation so that the observability code is compiled into the machine code, and then patched out of the machine code prior to loading the machine code onto the target platform. This process is illustrated in FIG. 1. As shown therein, an embedded application program 10 may include observability code 12 at an observability point OP within the application program code. An observability point is location within a software module at which observability code is either present or is called. After compilation of the application program, the observability code 12 is patched out, either by replacing the code with non-operative no-op instructions or by placing an unconditional jump at the observability point that bypasses the observability code. A no-op instruction (also called a NOP or NOOP, short for No Operation) is a computer programming instruction that effectively does nothing at all. A no-op instruction can be used as a place-holder to be replaced by active instructions later on in program development, or to replace removed instructions.

Replacing the call to the observability functions with no-op machine instructions reserves space within the program code so that the original call can be re-inserted if and when observability is desired.

The application code is then loaded onto a target system. After the code is on the target system, the observability code may be restored by reinserting the observability code at the observability point OP. Patching back the original observability instructions can be done by searching the machine instruction memory for a particular pattern of instructions, and re-inserting a call to the observability function at that point.

There may be many calls to observability functions within an embedded program. If the only information known about the placement of the observability functions is the machine address, it may be difficult to know which observability points to enable. In the case of patched-out observability code, just replacing the original call to an observability function may provide control of whether a particular usage of the observability function is active or not. However, it may not provide flexibility in terms of determining what type of observability is desired at a particular point in time.

Some embodiments of the present inventive concepts gather information about the context of compiled-in observability points within the system and keep that information in a file or database associated with the particular program image. This file or database is referred to herein as the Observability Point Information File ("OPIF"). Some embodiments of the present inventive concepts use an Observability Point Information File to control the activation, deactivation, and behavior of observability points.

Some particular embodiments provide an Observability Point Information File containing information about the location of observability points in a particular program image, and use that file to control observability points by modification of the machine instructions on the target.

Figure 2A:
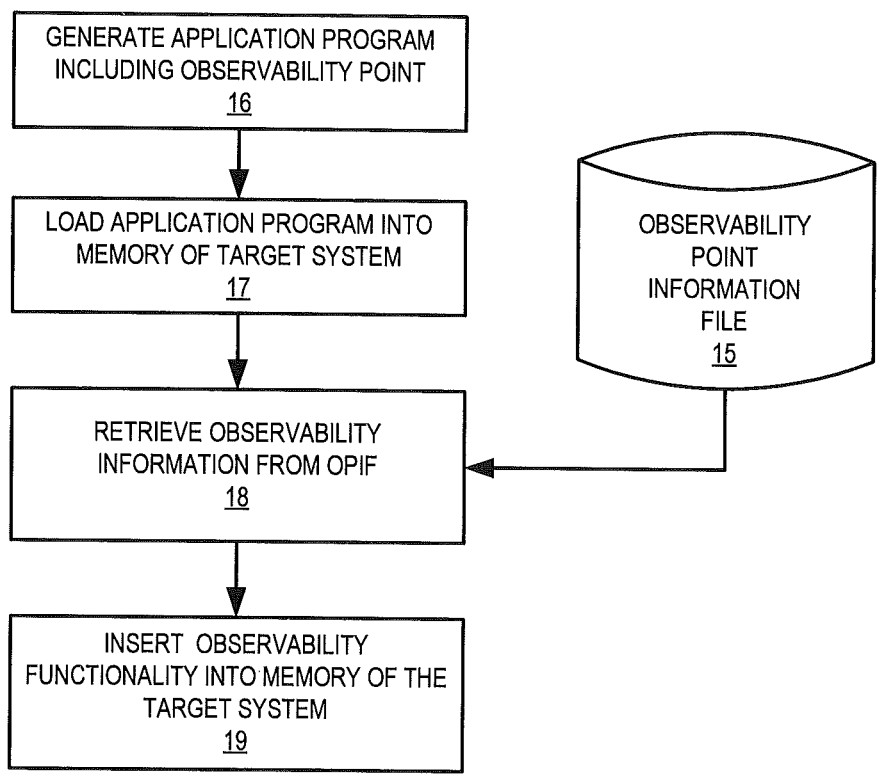
FIGS. 2A and 2B are flowcharts that illustrate the generation of machine code having dynamically modifiable/modified observability code in an application program in accordance with some embodiments.

Operations of systems/methods according to some embodiments are illustrated in the flowchart of FIG. 2A, which illustrates methods of managing observability code in an application program. The methods include generating an application program including an observability point (block 16). The observability point is a location in the application at which observability code, or a call to observability code, can be inserted. The methods include loading the application program into a memory of a target system (block 17), retrieving observability information from an observability point information file 15 (block 18), and inserting the observability code, or the call to the observability code, at the observability point in the memory of the target system using the observability information retrieved from the observability point information file (block 19).

Figure 2B:
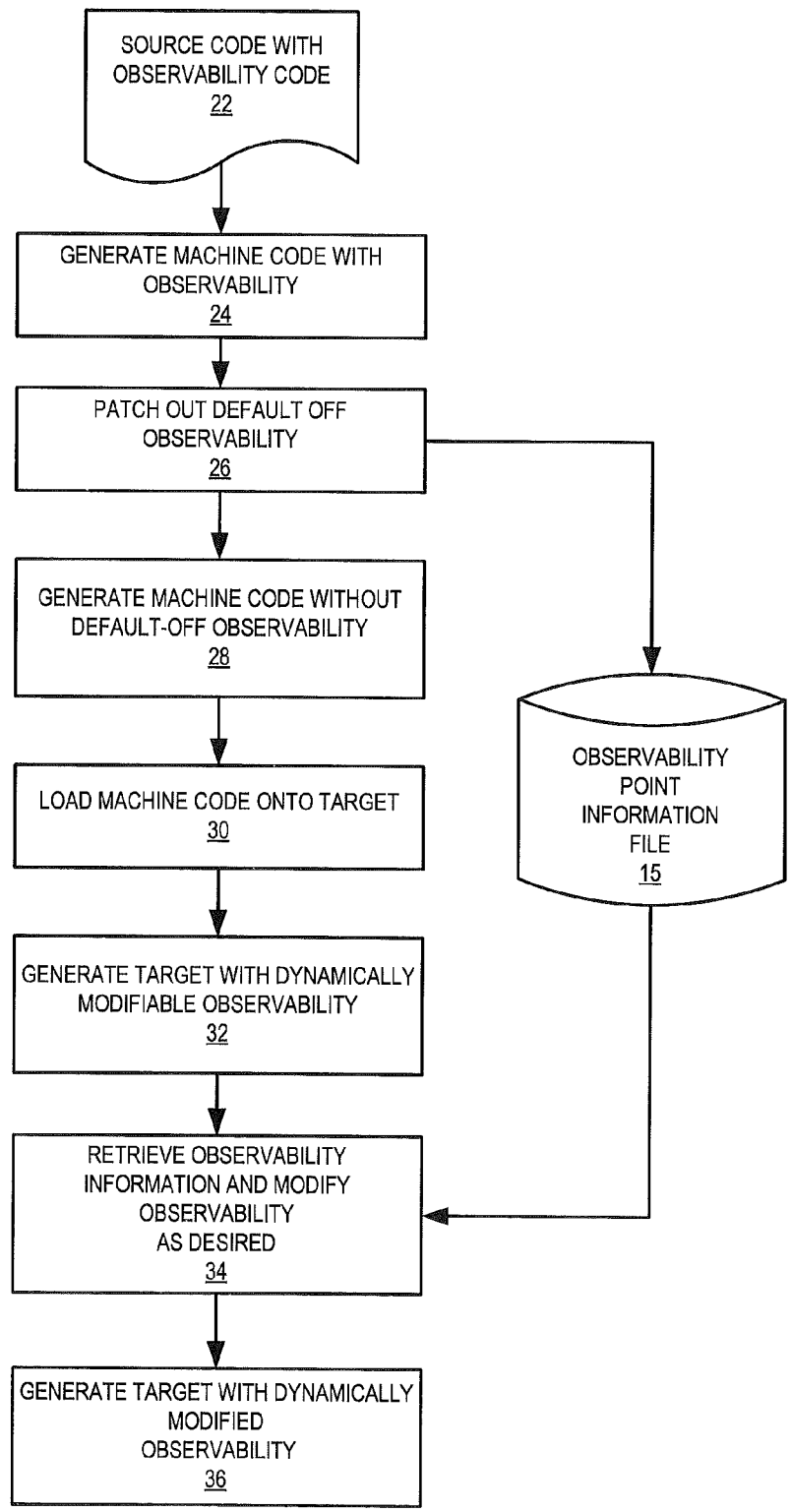

Operations of systems/methods according to some embodiments are illustrated in more detail in the flowchart of FIG. 2B. As shown therein, source code with observability code included therein is provided at block 22. Machine code including the observability code is then generated (block 24), for example, by compiling the source code.

Observability calls can be included in the application code without also including a surrounding ON/OFF check to determine at run-time if a particular observability function is active or not. A particular call can be defaulted to be 'OFF' by being patched out, and can be turned 'ON' by being patched back in on the target. Similarly, a particular call can be defaulted to 'ON' by not patching it out, and be turned 'OFF' by patching it out on the target.

At block 26, observability code that is set to default OFF is patched out of the code, for example, by replacing the code with no-op instructions or an unconditional bypass (jump) that skips the remaining instructions of the observability code.

When observability calls are patched out of the code, the information about the original instructions and locations (referred to herein as "patch back information") is stored in an Observability Point Information File 15. The OPIF may have a predetermined format, such as a database file.

In order to efficiently patch the calls to observability code out of a program, it is desirable for them to be recognizable so they can be found within the build files. An easy way to make the calls recognizable is for the code at each observability point to be a call to a function; calls to that function can be found within the machine instructions, potentially with the aid of relocation or debug information in Executable and Linkable Format ("ELF") files. This process may be dependent on the processor architecture and compile tool-chain, and may involve parsing and modifying ELF files.

The patch back information (including, for example, locations for the observability calls and the replaced instructions) in the OPIF 15 may be directly linked to a particular build, or version, of the system, because the instructions and their locations may change for each build.

The Observability Point Information File 15 can be supplemented with additional information gathered from the system, the source code, and/or from one or more external files or databases.

As a consequence of patching out the default OFF observability code, new machine code without the default OFF observability code is generated (block 28). The machine code may then be loaded onto the target system (block 30) to thereby generate a target system with dynamically modifiable observability (block 32).

The target system may thereafter be dynamically modified as desired to turn various observability functions on or off using information from the Observability Point Information File 15, for example, to determine what observability functions are available, and to control where and when they are activated (block 34). By selectively patching observability functions or function calls into and out of a target, a target having dynamically modified observability is created (block 36).

The patch back information in the OPIF 15 may be made available to users of the system as appropriate. The OPIF 15 could be included directly on the target system along with the other files associated with the load, and/or made available via a server, a control terminal, or other platform.

The information gathered maintained in the OPIF 15 file can include, for example, for each observability point:

The machine instruction address for the observability point

The original instructions that were replaced or could be replaced

The size in bytes of the observability instructions at the observability point

The location of the observability point within the source code (including file name and line number, e.g.)

A unique identifier for the observability point (giving a more stable identifier than file name and line number, since file name and line number can easily change as software is modified)

The name of the observability function, if any, that is called

The parameter names for the call to the observability function and the location of parameter data (e.g. a particular register or stack location)

Whether the particular observability point should be on or off by default, and

Additional information that is known about the particular point within the source code, such as the particular area of the code, and relative frequency and circumstances when that point in the code would be hit (on errors, on initialization, periodically, on packet arrival, etc).

This information can be used, along with appropriate control program(s) to query available observability points to determine which observability points are available, to select a set of observability points that are desired for the particular situation (general monitoring, problem investigation within a particular area, custom observability for particular customers), to identify the cost of turning on a particular set of observability points (in terms of memory, processing delays, bandwidth usage, etc.) (especially in cases where a turning on a set of observability points could degrade the system's performance), to turn sets of observability points on or off, and/or to modify the observability function call to have different behavior than the original code.

Figure 3:
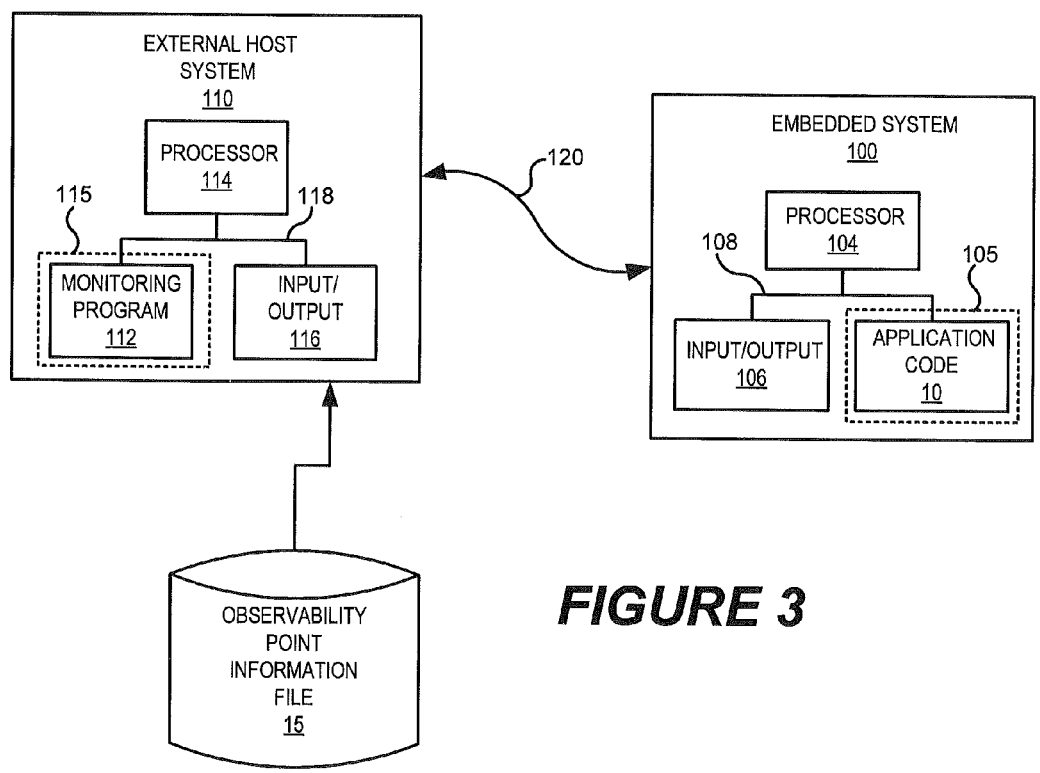
FIG. 3 is a block diagram that illustrates a system for generating machine code having dynamically modifiable/modified observability code in an embedded application program in accordance with some embodiments.

FIG. 3 illustrates a system for dynamically modifying the status and/or behavior of observability functions in an embedded system 100. The system includes an external host system 110 that communicates with an embedded system 100 over a communication link 120. The communication link 120 may be any type of communication link and link protocol that is/are supported by both the embedded system 100 and the external host 110. The communication link 120 may be a wired high speed data communication link, such as a USB link, a Firewire (IEEE 1394) link, an SATA link, Thunderbolt link, etc. Alternatively, the communication link 120 may be a wireless link, such as a WiFi link, a Bluetooth link, an infrared link, etc. The communication link 120 may also include a network connection, such as an internet connection that allows remote communication between the external host system 110 and the embedded system 100.

The external host system 110 includes a processor 114 that executes a monitoring application 112 stored in a memory 115. The external host system 110 further includes an input/output interface 116 that facilitates communication with the embedded system 100. The processor 114 of the external host system 110 communicates with the memory 115 and the input/output interface 116 via a data bus 118.

The external host system 110 is also configured to access an observability point information file 15 that may be stored in an external server, in the external host system 110 itself, in the embedded system 100, or any other location that is accessible by the external host 110. The external host system 110 may include a monitoring application 112 that controls the updating of observability in a software program running on the embedded system 100.

The embedded system 100 includes a processor 104, a memory 105 in which application code 10 can be stored, and an input/output interface 106 that facilitates communication with the external host system 110. The processor 104 of the embedded system 100 communicates with the memory 105 and the input/output interface 106 via a data bus 108.

Figure 4:
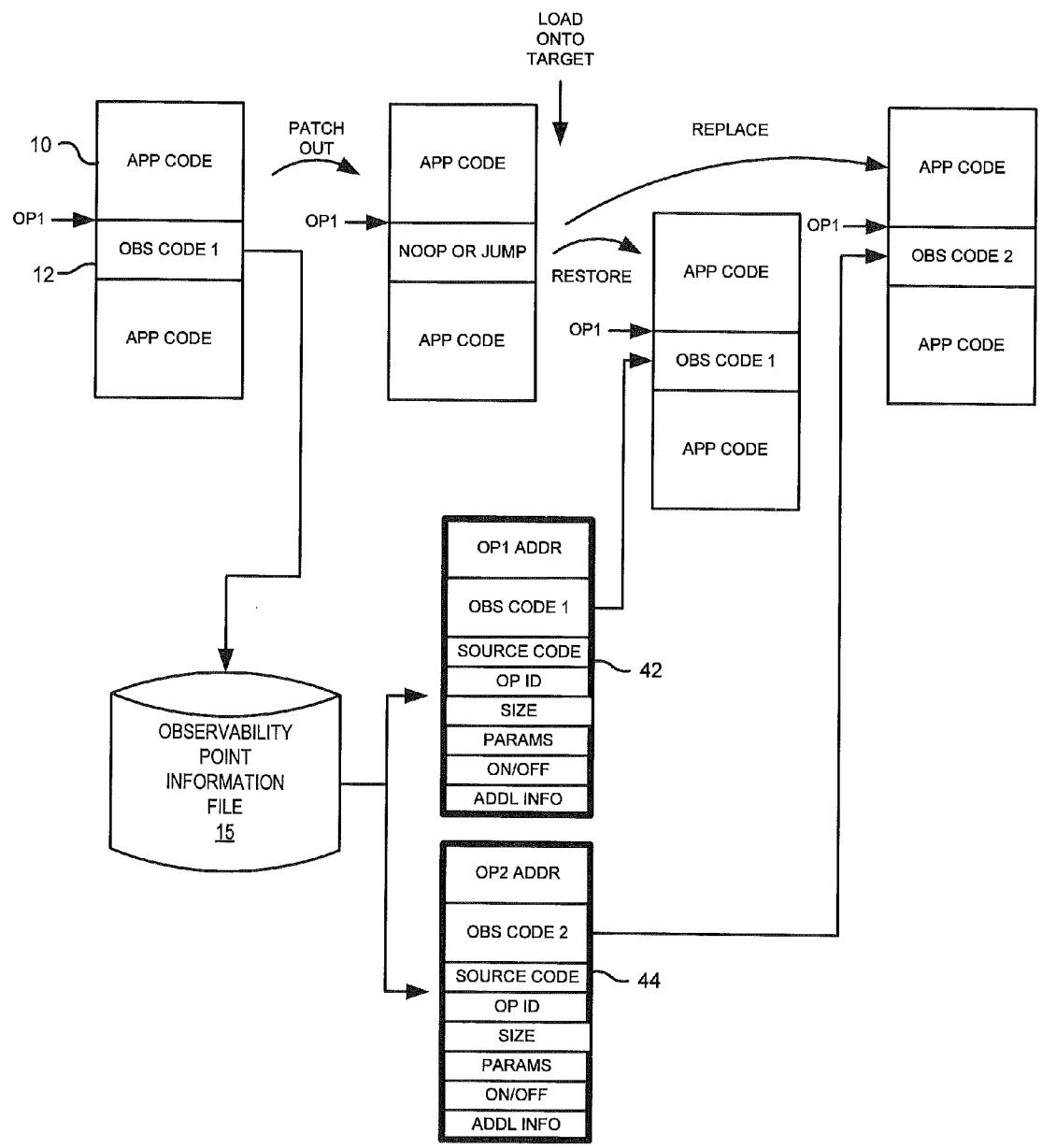
FIGS. 4 and 5 are block diagrams that illustrate the generation of machine code having dynamically modifiable/modified observability code in accordance with some embodiments.

Referring to FIGS. 3 and 4, application code 10 to be loaded into the memory 105 of a target system 100 includes first observability code, denoted OBS CODE 1 in FIG. 4, at observability point OP1 in the application code 10. At build time or otherwise before being loaded onto the target system, a check is made to determine if the first observability code OBS CODE 1 should be turned OFF as a default condition, and if so, the first observability code OBS CODE 1 is patched out of the application code 10. A record 42 corresponding to the patched out observability code is created or updated in an Observability Point Information File 15. The record 42 may include a machine address of the observability point, the actual observability code that is patched out, a reference to source code of the observability code, the size of the observability code, an observability point identifier, various parameters, a default ON/OFF identifier and/or additional information.

The generation of the Observability Point Information File and handling of default ON/OFF settings may be performed at the build time of a particular build, and the resulting executable code and Observability Point Information File may be used on many targets that are to be loaded with that particular build. Additionally, different customers who would receive the same build may want different Observability Points to be defaulted to be ON or OFF. Customization of the load could be done at a point between the generation of the load and shipment to the customer. There is also the possibility of applying modifications to the specific copy of the machine code that will be loaded onto a particular target. This would allow for target instance specific observability that would take effect the next time the target is reloaded from that copy of the machine code, and would be an efficient way to have persistent changes to the activated observability for that target instance. In addition, target specific modifications to the observability could be performed after the machine code is loaded into the target memory. This process can include notification to the host system that the target has been reloaded, giving the host system an opportunity to send instructions to modify observability.

As indicated in FIG. 4, various other instances of observability code may also be patched out of the application code 10 and corresponding records created/updated in the OPIF 15. For example, as shown in FIG. 4, the OPIF 15 may also include a record 44 for second observability code, denoted OBS CODE 2 in FIG. 4. Similar information may be included in the OPIF record 44 for the second observability code OBS CODE 2 as was included for the first observability code OBS CODE 1.

Still referring to FIG. 4, after the first observability code OBS CODE 1 is patched out of the application program 10, the application program 10 is loaded onto the target system 100.

It will be appreciated that processing the application code 10 to identify observability functions that are to be patched out of the machine code, patching out the identified observability functions, building the OPIF 15, and loading the modified machine code onto the target system 100 could be performed by the external host system 110 and/or by one or more different hosts, such as a dedicated programmer, server or other device. Moreover, each of these functions could be performed by different devices and/or by the same device.

After the modified code is loaded onto the target system 100, it may be determined, either by a user and/or programmatically, that observability code should be restored at observability point OP1. In that case, the external host system 110 may retrieve the necessary information from the OPIF 15 to re-activate the observability code at observability point OP1. Through a control program running on the external host 110, the user may elect to restore the first observability code OBS CODE 1 at the observability point OP1. The external host system 110 may search the OPIF 15 for the record 42 of the for OBS CODE 1. Once the record 42 is identified, the external host system 110 may retrieve the machine code for OBS CODE 1 from the OPIF 15 and provide it to the target system, which may write it into the application program 10 at the address of OP1. The act of loading or modifying the program memory of the target system 100 may not be done directly by the host system 110. Rather, the host system 110 may send a packet of information to the target system 100 containing the necessary information (address, replacement instructions, authentication of the host system performing the request, etc) for the target system 100 to modify its own memory.

As illustrated in FIG. 4, the observability code itself (or a reference to the observability code) is stored in the OPIF 15 and not in the memory of the embedded device 100. This may be done to save memory space in the embedded device, which is often limited in such devices. The size of the OPIF 15 on the other hand, may be virtually unlimited compared to the size of memory available in the embedded device 100.

Still referring to FIG. 4, in some embodiments, the user may determine that it is desirable to activate a different observability function at the observability point OP1. For example, the user may determine that it is desirable to activate the observability function represented by OBS CODE 2 at observability point OP1. In that case, the external host system 110 may search the OPIF 15 for the record 44 for OBS CODE 2, and once the record 44 is identified, the external host system 110 may retrieve the machine code for OBS CODE 2 from the record 44 of the OPIF 15 and write it into the application program 10 at the address of OP1.

It will be appreciated that in this case, it may be desirable for the size of the second observability code OBS CODE 2 to be no larger than the first observability code OBS CODE 1. If OBS CODE 2 is smaller than OBS CODE 1, any unused space can be padded, for example, with no-op instructions. The control program on the external host system 110 can check the size of the entry for OBS CODE 1 and generate an error or warning if the user attempts to activate a larger fragment of observability code in that location.

Figure 5:
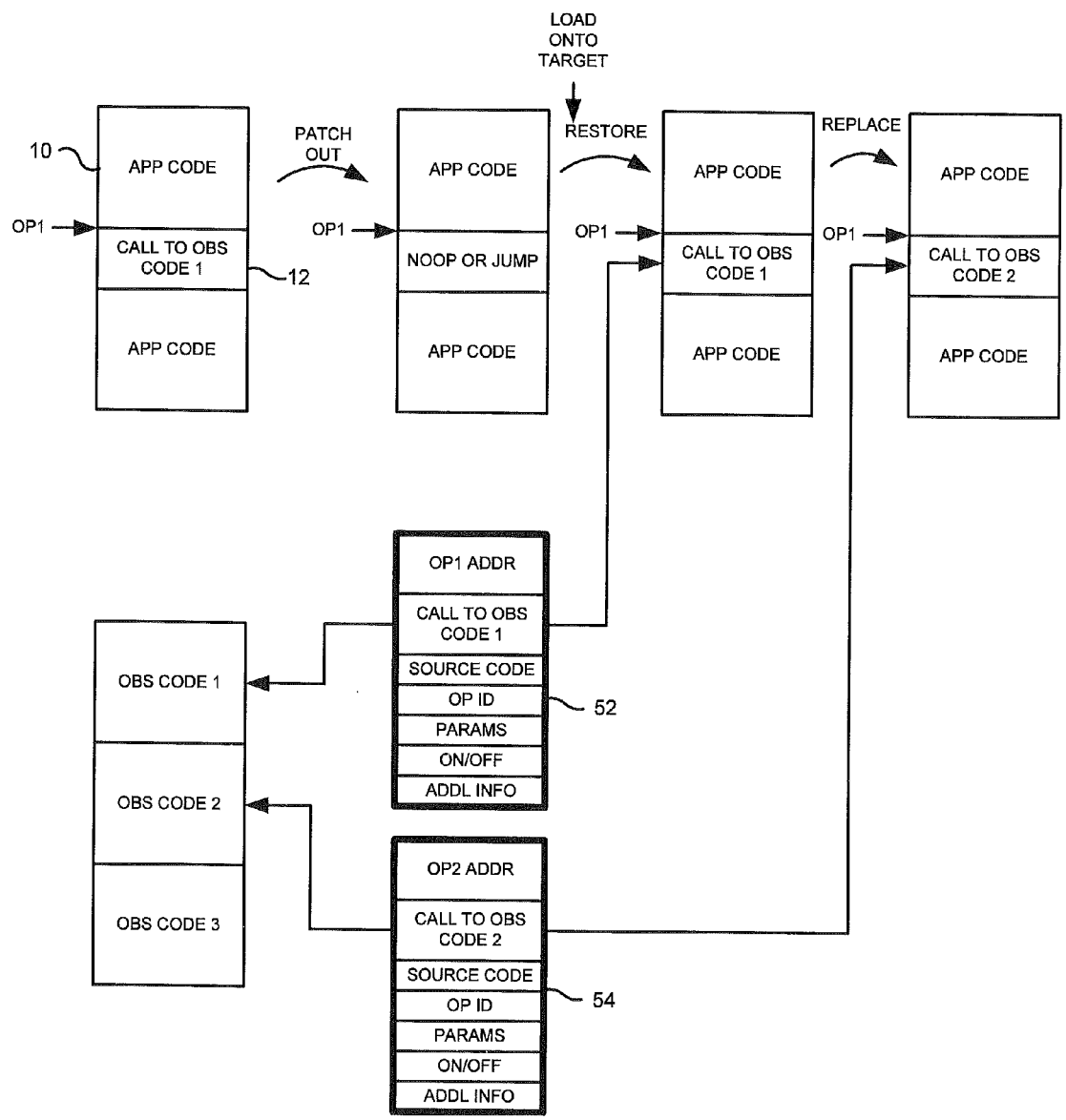

Further embodiments of the inventive concepts are illustrated in FIG. 5. Referring to FIGS. 3 and 5, application code 10 to be loaded onto a target system 100 includes a call to first observability code OBS CODE 1, at observability point OP1 in the application code 10. In the embodiments of FIG. 5, the OBS CODE 1 is stored in the memory of the embedded device 100, and the entry at observability point 1 is not the actual observability code, but simply a call to the observability code OBS CODE 1.

Before being loaded onto the target system, a check is made to determine if the first observability code OBS CODE 1 should be turned OFF as a default condition, and if so, the call to the first observability code OBS CODE 1 at OP1 is patched out of the application code 10. A record 52 corresponding to the patched out observability code is created or updated in an Observability Point Information File 15. The record 52 may include a machine address of the observability point, the call to OBS CODE 1 that is patched out, a reference to source code of the observability code, an observability point identifier, various parameters, a default ON/OFF identifier and/or additional information.

As indicated in FIG. 5, various other instances of observability code may also be stored in corresponding records in the OPIF 15. For example, as shown in FIG. 5, the OPIF 15 may also include a record 54 for second observability code, denoted OBS CODE 2 in FIG. 5. Similar information may be included in the OPIF record 54 for the second observability code OBS CODE 2 as was included for the first observability code OBS CODE 1.

Still referring to FIG. 5, after the first observability code OBS CODE 1 is patched out of the application program 10, the application program 10 is loaded onto the target system 100.

After the modified code is loaded onto the target system 100, it may be determined, either by a user and/or programmatically, that observability code should be restored at observability point OP1. In that case, the external host system 110 may retrieve the information in the OPIF 15 to re-activate the observability code at observability point OP1. Through a control program running on the external host 110, the user may elect to restore the first observability code OBS CODE 1 at the observability point OP1. The external host system 110 may search the OPIF 15 for the record 52 of the for OBS CODE 1. Once the record 52 is identified, the external host system 110 may retrieve the machine code for the call to OBS CODE 1 from the OPIF 15 and write it into the application program 10 at the address of OP1.

After restoring the observability code OBS CODE 1 to observability point OP1, in some embodiments, the user may determine that it is desirable to activate a different observability function at the observability point OP1. For example, the user may determine that it is desirable to activate the observability function represented by OBS CODE 2 at observability point OP1. In that case, the external host system 110 may search the OPIF 15 for the record 54 for OBS CODE 2, and once the record 54 is identified, the external host system 110 may retrieve the machine code for the call to OBS CODE 2 from the record 54 of the OPIF 15 and write it into the application program 10 at the address of OP1.

It will be appreciated that in this case, the external host system 110 may not have to check the size of the second observability code OBS CODE 2, because the call to the second observability code OBS CODE 2 may be the same size as the call to the first observability code OBS CODE 1.

Using a file such as an OPIF 15 to maintain information about the location of the observability points in the system, how many machine instructions can be placed at those instructions, and, given knowledge of the mapping of function parameters to registers or function stack location, what information is available to be observed may enable a user or system designer to modify the behavior of a particular type of observability code during run-time operation of a system.

Using an Observability Point Information File 15 to control activation, deactivation, and modification of observability behavior makes it practical to have large sets of observability points that can be activated or deactivated efficiently and/or quickly.

The use of a unique identifier to identify the observability point, along with the machine instruction location information in the Observability Point Information File 15 may also make it practical to modify the machine code without the use of compiler debug output or specialized knowledge of the code structure. This can make the use of a compile-in/patch-out/patch-in approach as described herein faster and/or more memory efficient.

Furthermore, embodiments of the present inventive concepts can make it possible to quickly and efficiently change the behavior of observability features of an embedded software application. For example, observability code can have varying levels of impact on system performance. The OPIF 15 can store information about levels of performance impact associated with various types of observability features, which can assist a user in making decisions about what types of observability features to activate and where in the code to activate them to manage performance of the system. Moreover, using the OPIF 15 to manage observability functions may enable a user to quickly and efficiently change from monitoring one type of event to monitoring a different type of event, providing different types of output, monitoring events at different parts of the application, etc.

For example, referring again to FIG. 3, using a monitoring application 112 running on the external host 110, a user may activate a first level of monitoring of an application on an embedded system 100, which, in this example is a router. The first level of monitoring may, for example, count incoming packets processed by the router on each port and instruct the router to flash a light if the number of incoming packets processed by the router during a specified time on any port interval exceeds a threshold level. The first level of monitoring may be enabled by activating first observability code OBS CODE 1 at a defined set of observation points in the application program running on the router. The first observability code OBS CODE 1 may have minimal impact on the operation of the router.

Based on the results of activating the first observability code OBS CODE 1, the user may decide to activate more extensive monitoring of packets, for example, to determine if a packet-based attack is occurring. In that case, the user may, using the monitoring application 112 on the external host 110, activate the second observability code OBS CODE 2 at each of the defined set of observability points. Using the OPIF 15, the monitoring application 112 may be able to quickly and efficiently replace all calls to the first observability code OBS CODE 1 with calls to the second observability code OBS CODE 2.

The second observability code OBS CODE 2 may perform more extensive data collection and reporting than the first observability code OBS CODE 1. For example, the second observability code OBS CODE 2 may gather data related to the destination and origin of incoming packets, the port on which the packets arrived, the size of the packets, the frequency of packet arrival, etc., and may transmit such information to the external host system 110 or to another host over the data communication link 120 or via a different data communication link, may display the results on a monitor, may process the results, etc. The second observability code OBS CODE 2 may therefore require significantly more resources than the first observability code OBS CODE 1. However, when it is no longer necessary to collect the information provided by the second observability code OBS CODE 2, the monitoring application 112 may quickly and efficiently inactivate the second observability code OBS CODE 2 using the information in the OPIF 15.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of managing observability code in an application program, comprising:
   generating an application program including an observability point, the observability point comprising a location in the application at which first observability code is included;
   patching the first observability code out of the application program;
   loading the application program from which the first observability code was patched out into a memory of a target system;
   retrieving observability information from an observability point information file; and
   inserting second observability code that is different from the first observability code at the observability point in the memory of the target system using the observability information retrieved from the observability point information file.

2. The method of claim 1, wherein loading the application program into the memory of the target system comprises loading the application program without the observability code into the memory of the target system.

3. The method of claim 2, wherein patching the first observability code out of the application program comprises replacing the first observability code with no-op instruction.

4. The method of claim 2, wherein patching the first observability code out of the application program comprises inserting an unconditional jump at the observation point that bypasses the first observability code.

5. The method of claim 1, farther comprising:
   executing the application program including the second observability code from the memory of the target system.

6. The method of claim 2, further comprising:
   writing the observability information to the observability point information file in connection with patching the first observability code out of the application program.

7. The method of claim 1, wherein the observability information includes an address of the observability point and the first observability code.

8. The method of claim 1, wherein the observability information includes an identification code that is unique to the observability point.

9. The method of claim 1, wherein the observability point information file is stored in the target system.

10. The method of claim 1, wherein the observability point information file is stored remotely from the target system.

11. A host system configured to manage observability code in an application program on a target system including an application program including an observability point, the observability point comprising a location in the application program at which the observability code is inserted, the host system comprising:
   a processor; and
   a monitoring application executed by the processor, the monitoring application configured to (i) retrieve observability information from an observability point information file, and (ii) provide appropriate instructions for the target system to insert the observability code at the observability point in the memory of the target system using the observability information retrieved from the observability point information file;
   wherein the monitoring application is further configured to generate the application program including first observability code at the observability point, and, before loading the application program into the memory of the target system, to patch the first observability code out of the application program so that the application program from which the first observability code was patched out is loaded into the memory of the target system without the first observability code into the memory of the target system; and
   wherein the monitoring application is further configured to retrieve second observability information from the observability point information file, and to provide instructions for the target system to insert second observability code that is different from the first observability code at the observability point in the memory of the target system using the second observability information retrieved from the observability point information file.

12. The host system of claim 11, wherein the monitoring application is further configured to patch the observability code out of the application program by replacing the observability code with no-op instructions.

13. The host system of claim 11, wherein the monitoring application is further configured to patch the observability code out of the application program by inserting an unconditional jump at the observation point that bypasses the observability code.

14. The host system of claim 11, wherein the monitoring application is further configured to write the observability information to the observability point information file in connection with patching the observability code out of the application program.

15. The host system of claim 11, wherein the observability information includes an address of the observability point and the observability code.

16. The host system of claim 11, wherein the observability information includes an identification code that is unique to the observability point.

17. A method of managing observability code in an application program, comprising:
   generating the application program including first observability code at an observability point in the application program;
   patching the first observability code out of the application program;
   writing first observability information to an observability point information file in connection with patching the first observability code out of the application program, the first observability information describing the observability point and the first observability code;
   loading the application program without the first observability code into a memory of a target system;
   retrieving second observability information from the observability point information file, the second observability information describing the second observability code that is different from the first observability code; and inserting the second observability code at the observability point in the memory of the target system.

18. The method of claim 1, wherein generating the application program comprises compiling the application program.

* * * * *